C. W. SALADEE.
Running-Gear.
No. 15,345.
Patented July 15, 1856.
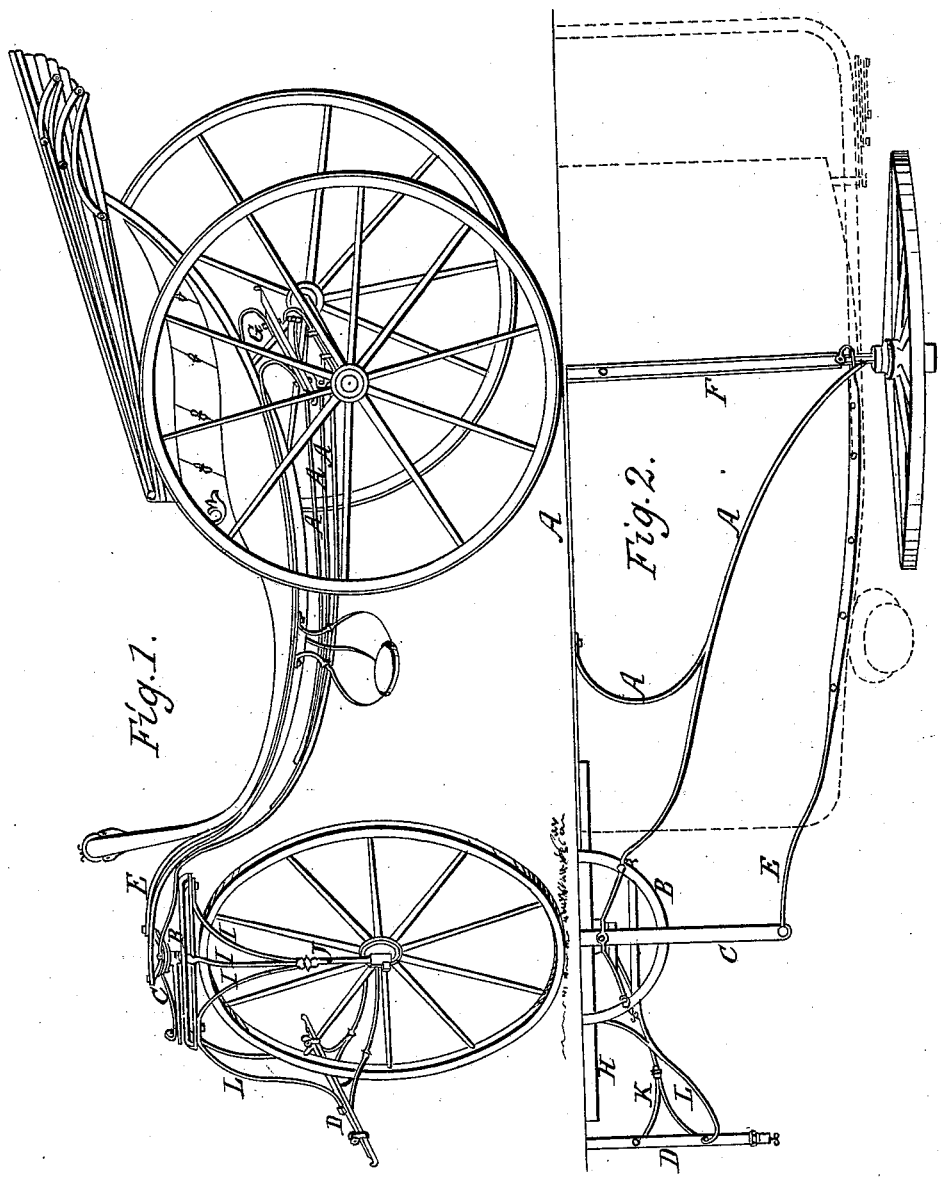
Witnesses.
B. F. Lincoln.
H. N. Jennings.
Inventor,
C. W. Saladee.

UNITED STATES PATENT OFFICE.

CYRUS W. SALADIE, OF COLUMBUS, OHIO.

THREE-WHEELED PLEASURE-CARRIAGE.

Specification of Letters Patent No. 15,345, dated July 15, 1856.

*To all whom it may concern:*

Be it known that I, CYRUS W. SALADIE, of Columbus, Ohio, have invented a new and useful Improvement in the Construction of Three-Wheeled Pleasure-Vehicles.

The objects I have in view are, 1st, facility of turning short around; 2d, to get in, and alight from the vehicle without having, (as is common in all four wheeled vehicles) the front wheel in the way of so doing; 3d, simplicity of construction, and 4th, lightness and ease of draft.

The ordinary pleasure wagon, for two persons, is constructed upon four wheels—the body being hung low, and made wide, prevents the vehicle from turning in as small a space as safety and convenience demands, for the reason, that the front wheels come in immediate contact with the body when in the act of turning. To prevent this serious difficulty, there have been many attempts made to improve the connection of the front axle with the perch so as to facilitate short turning, and various improvements of this nature have been patented both here and in Europe. But experience in the use of them has proven that they are all alike imperfect, for the reason, that, the operation is such, that when in the act of turning, the front extremity of the body, with all its weight is thrown off of the center of the fore axle and that too in a direction contrary to that of the front wheels; therefore its liabilities to upset is materially increased, in place of diminished, as it should be. Moreover, the ordinary four wheeled two passenger wagon is universally objected to, on account of the great inconvenience of getting in and out, in consequence of the front wheels coming directly in front of the passage and step on the side of the body, and before an entrance into the carriage can be gained with any degree of ease the horse must first be turned short off to the opposite side on which you are going to get in or out at, and even after this trouble, the wheel is not entirely out of the way, as the body will not in the majority of cases admit of the wheel on the opposite side to run under.

I am aware also that vehicles have been constructed on three wheels with the view of amending those prevalent imperfections in the four wheeled wagon, and they likewise have failed to accomplish an end so desirable. It is true, that the application of a third wheel, as constructed in steam fire engines land propellers, and hose carts, answer an admirable purpose to that peculiar denomination of locomotive vehicles. But the principle upon which it is applied, together with its complication, and weight necessarily required, is such that it never can be advantageously adapted to light vehicles for pleasure. The reasons are obvious. To hose carts and steam fire engines, the third wheel is inclosed by another wheel of larger diameter which rests in a horizontal position upon the axle in the third wheel. Another wheel of the same diameter is laid upon this horizontal wheel, and on which the foundation of the front part of the vehicle is laid. The two horizontal wheels thus forming a double circle, and by which means the wheel is enabled to turn. But the friction that those two large rubbing surfaces would create in a light pleasure vehicle would at once become a serious objection. Moreover there is no way possible in which to apply an ordinary phaeton or buggy body to a carriage part thus constructed, as the foundation of the body itself must rest in front on either side of the large horizontal circles, and to make the frame work of the body heavy enough for that, is to make it clumsy and unsightly, and therefore not desirable.

With the hope of overcoming the objection above stated in the four wheeled wagon, and those that would be attending the application of the old plan of three wheeled vehicles to pleasure carriages, I was induced to commence a series of experiments which resulted in what is represented by the accompanying drawings.

In the first place I constructed a carriage, with body, like Fig. 1, which I made to rest on the hind axle by the attachment of sprouts combined springs, which were fastened to the axle, body loops, and on the bottom of the body in front. In the third wheel I applied a revolving axle, on either end of which I fastened a spring and on top of the latter by means of braces I supported a 20 inch circle and another circle of like diameter was attached to a cross bar and made to rest upon the one first mentioned, and by this means I secured the turning point on top of the third wheel. The whole was then attached to the body by means of two loops running out from the body, and fastened on the ends of the crossbar resting on the horizontal circle, this being the only connection between the hind wheels and the front one— or between the body and the front wheel. But when all complete and brought to a practical test it proved an entire failure. A moment's inspection now convinced me that unless the front wheel could be permanently connected to the hind ones and independent of the body I could never succeed in making it work as it should. The great difficulty which presented itself was a weakness in the connection of the front wheel and the body, and also a side motion was attending the front wheel that rendered it entirely useless. The cause of this was owing, partly, to the springs which were attached to the front axle and the bottom of the braces holding the double circle, and a lack of a permanent connection of the front wheel to the back ones, as only the loops running out from the body were insufficient to support it. I then took out the springs between the braces and the front axle and caused the braces to be made longer and rest permanently on the axle, as shown in Fig. 1, (brace 1), after which I connected the front wheel and structure to the hind axle by means of three strong iron perches A A A, Fig. 2 and secured them in front to the horizontal circle 3 as seen in Fig. 2, and in the rear to axle F, by clips. This proved perfection, as now the front wheel was perfectly stiff and steady and the whole arrangement seemed strong and light. I next put an ordinary elliptic spring on the hind axle on which I bolted a cross bar, after the common way, and on the circle over the front wheel I applied a piece of spring steel (C) shaped like a half elliptic the ends turned up and on which I bolted the body loops or irons (E) and behind I made the body to rest on the spring bar in the ordinary way.

The draw bar, D, in front of the third wheel, I secure in its desired location by means of light iron braces, running from the double circle and the axle as shown in the drawings, or by any other means that will properly support it. This carriage is now completed and in every day use, and proves to be one of the lightest, strongest, and most convenient pleasure carriages I have ever had.

What I claim as my invention and desire to secure by Letters Patent, is—

The longitudinal braces A A A, in combination with the double circle B by which means the third wheel is firmly connected to the hind axle and wheels in the manner, and for the purpose set forth in the foregoing specification and shown by the accompanying drawings.

CYRUS W. SALADIE.

Witnesses:
  B. F. LINCOLN,
  H. N. JENNINGS.